US012560690B2

(12) United States Patent
Ossig et al.

(10) Patent No.: US 12,560,690 B2
(45) Date of Patent: Feb. 24, 2026

(54) SYSTEM AND METHOD OF IMPROVING LASER SCANNER UNAMBIGUITY

(71) Applicant: FARO Technologies, Inc., Lake Mary, FL (US)

(72) Inventors: Martin Ossig, Tamm (DE); Oswin Horvath, Tamm (DE)

(73) Assignee: FARO Technologies, Inc., Lake Mary, FL (US)

( * ) Notice: Subject to any disclaimer, the term of this patent is extended or adjusted under 35 U.S.C. 154(b) by 819 days.

(21) Appl. No.: 17/813,631

(22) Filed: Jul. 20, 2022

(65) Prior Publication Data

US 2024/0027592 A1     Jan. 25, 2024

Related U.S. Application Data

(60) Provisional application No. 63/238,988, filed on Aug. 31, 2021.

(51) Int. Cl.
| | |
|---|---|
| *G01S 7/4915* | (2020.01) |
| *G01S 17/36* | (2006.01) |
| *G01S 17/894* | (2020.01) |

(52) U.S. Cl.
CPC ............ *G01S 7/4915* (2013.01); *G01S 17/36* (2013.01); *G01S 17/894* (2020.01)

(58) Field of Classification Search
None
See application file for complete search history.

(56) References Cited

U.S. PATENT DOCUMENTS

| | | | | |
|---|---|---|---|---|
| 2020/0249348 A1* | 8/2020 | Mathy | .................. | H04N 13/207 |
| 2020/0326426 A1* | 10/2020 | Godbaz | ................... | G01S 17/26 |

FOREIGN PATENT DOCUMENTS

| | | | | |
|---|---|---|---|---|
| CN | 118348546 A | * 7/2024 | .......... | G01S 7/4915 |
| EP | 3757616 A1 | * 12/2020 | .......... | H10F 39/803 |

* cited by examiner

*Primary Examiner* — Luke D Ratcliffe
(74) *Attorney, Agent, or Firm* — McCarter & English, LLP; Dave S. Christensen

(57)     ABSTRACT

A system and method for determining a distance is provided. The system includes a scanner that captures a scan-point by emitting a light having a base frequency and at least one measurement frequency and receiving a reflection of the light. Processors determine the distance to the scan-point by using a method that comprises: generating a signal in response to receiving the reflection of light; determining a first distance to the scan-point based on a phase-shift of the signal and the measurement frequency; determining a second distance and a third distance based on a phase-shift of the signal determined using a Fourier transform at the measurement frequency on a pair of adjacent half-cycles; determining a corrected second distance and a corrected third distance by compensating for an error in the second distance and third distance by performing the Fourier transform on the pair of adjacent half-cycles.

20 Claims, 9 Drawing Sheets

SYSTEM AND METHOD OF IMPROVING LASER SCANNER UNAMBIGUITY

CROSS REFERENCE TO RELATED APPLICATIONS

This application claims the benefit of U.S. Provisional Application Ser. No. 63/238,988, filed Aug. 31, 2021, the entire disclosure of which is incorporated herein by reference.

BACKGROUND

The subject matter disclosed herein relates to use of a 3D laser scanner coordinate measurement device, and particularly to determining a distance to a scan-point captured by the 3D laser scanner, and in particular to increasing the scanning speed of the 3D laser scanner.

Typically, a 3D laser scanner, such as a time-of-flight (TOF) laser scanner, steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target. While a TOF laser scanner is generally used as an example 3D laser scanner when describing technical solutions herein, other types of laser scanners can also be used.

A TOF laser scanner is a scanner in which the distance to a target point is determined based on the speed of light in air between the scanner and a target point (the propagation time). Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Accordingly, while existing 3D scanners are suitable for their intended purposes, what is needed is a 3D scanner having certain features of embodiments of the present disclosure.

BRIEF DESCRIPTION

According to one or more embodiments, a system is provided. The system includes a three-dimensional (3D) scanner that captures a scan-point of an object in a surrounding environment by emitting a beam of light having a base frequency and at least one measurement frequency equal to a multiple of base frequency and receiving a reflection of the beam of light, a distance to the object being determined based on a phase-shift of the reflected beam of light at the measurement frequency. One or more processors are provided that determine the distance to the scan-point using a method that comprises: generating a signal in response to receive the reflection of light; determining a first distance to the scan-point based at least in part on phase-shift of the signal, the phase-shift determined using a first signal processing method based on the measurement frequency; determining a second distance and a third distance based on a phase-shift of the signal, the phase-shift determined using a Fourier transform at measurement frequency on a pair of adjacent half-cycles; determining a corrected second distance and a corrected third distance by compensating for an error in the second distance and third distance, the error being defined at least in part on the performing of the Fourier transform on the pair of adjacent half-cycles; and saving the corrected second distance and third corrected distance into memory.

In addition to one or more of the features described herein, or as an alternative, further embodiments of the system may include the signal processing method being a Fourier Transform.

In addition to one or more of the features described herein, or as an alternative, further embodiments of the system may include the compensating for the error including modifying the signal of the reflected beam of light with a high pass filter, the high pass filter removing the base frequency from the signal to generate a second signal, the second signal including the second base frequency, the second base frequency equal to at least 2 times of the original base frequency.

In addition to one or more of the features described herein, or as an alternative, further embodiments of the system may include the compensating for the error including performing a second Fourier transform on a filtered signal generated by the high pass filter at the measurement frequency.

In addition to one or more of the features described herein, or as an alternative, further embodiments of the system may include the second Fourier transform being performed on two adjacent full cycles of the second frequency.

In addition to one or more of the features described herein, or as an alternative, further embodiments of the system may include the compensating for the error includes: determining a first correction value associated with the second distance and a second correction value associated with the third distance; wherein the corrected second distance is based at least in part on the first correction value and the second distance; and wherein the corrected third distance is based at least in part on the second correction value, and the third distance.

In addition to one or more of the features described herein, or as an alternative, further embodiments of the system may include: determining a third correction value associated with the corrected second distance; determining a fourth correction value associated with the corrected third distance; comparing a difference between the first correction value and the third correction value to a first threshold; and comparing a difference between the second correction value and the fourth correction value to a second threshold.

In addition to one or more of the features described herein, or as an alternative, further embodiments of the system may include saving the corrected second distance and the corrected third distance when the difference between the first correction value and the third correction value is less than the first threshold and the difference between the second correction value and the fourth correction value is less than the second threshold.

In addition to one or more of the features described herein, or as an alternative, further embodiments of the system may include: determining a corrected fourth distance based at least in part on the third correction value and the second distance when the difference between the first correction value and the third correction value is greater than the first threshold; and determining a corrected fifth distance based at least in part on the fourth correction value and the third distance when the difference between the second correction value and the fourth correction value is greater than the second threshold.

In addition to one or more of the features described herein, or as an alternative, further embodiments of the system may include repeating the steps of claim 7 when the difference between the first correction value) and the third correction value is greater than the first threshold or the difference between the second correction value and the fourth correction value is greater than the second threshold.

In addition to one or more of the features described herein, or as an alternative, further embodiments of the system may include the first correction value and the second correction value being determined from a lookup table.

In addition to one or more of the features described herein, or as an alternative, further embodiments of the system may include determining a first brightness and a second brightness based at least in part on a brightness correction lookup table, the first brightness being based at least in part on the corrected second distance and the second brightness being based at least in part on the corrected third distance.

In addition to one or more of the features described herein, or as an alternative, further embodiments of the system may include performing a validation of the corrected second distance and the corrected third distance.

In addition to one or more of the features described herein, or as an alternative, further embodiments of the system may include the validation including finding an average distance of the corrected second distance and the corrected third distance and comparing a difference between the first distance and the average distance to a threshold.

In addition to one or more of the features described herein, or as an alternative, further embodiments of the system may include determining the corrected second distance and the corrected third distance are invalid when the difference between the first distance and the average distance is greater than a threshold.

In addition to one or more of the features described herein, or as an alternative, further embodiments of the system may include replacing the corrected second distance and the corrected third distance with the first distance when the corrected second distance and the corrected third distance are invalid.

In addition to one or more of the features described herein, or as an alternative, further embodiments of the system may include the method further comprising: determining a noise level in the distance measurement; discarding the corrected second distance and the corrected third distance when the noise level is above a threshold; and saving the first distance into memory.

In addition to one or more of the features described herein, or as an alternative, further embodiments of the system may include the determining of the noise level being based at least in part on a comparison of the amplitude of the signal to an overall power signal.

According to one or more embodiments, a computer-implemented method is provided. The computer-implemented method includes: transmitting a beam of light from a 3D scanner and receiving a reflection of light from a scan-point of an object in a surrounding environment, the beam of light having a base frequency and at least on measurement frequency equal to a multiple of the base frequency, the 3D scanner being configured to determine a distance to the object being determined based on a phase-shift of the reflected beam of light at the measurement frequency; generating a signal in response to receive the reflection of light; determining a first distance to the scan-point based at least in part on phase-shift of the signal, the phase-shift determined using a first signal processing method based on the measurement frequency; determining a second distance and a third distance based on a phase-shift of the signal, the phase-shift determined using a Fourier transform at measurement frequency on a pair of adjacent half-cycles; determining a corrected second distance and a corrected third distance by compensating for an error in the second distance and third distance, the error being defined at least in part on the performing of the Fourier transform on the pair of adjacent half-cycles; and saving the corrected second distance and third corrected distance into memory.

In addition to one or more of the features described herein, or as an alternative, further embodiments of the computer implemented method may include the signal pro-cessing method being a Fourier Transform.

In addition to one or more of the features described herein, or as an alternative, further embodiments of the computer implemented method may include the compensat-ing for the error including a performing of a second Fourier transform on a filtered signal generated by the high pass filter at the measurement frequency.

In addition to one or more of the features described herein, or as an alternative, further embodiments of the computer implemented method may include the second Fourier transform being performed on two adjacent full cycles of the second frequency.

In addition to one or more of the features described herein, or as an alternative, further embodiments of the computer implemented method may include the compensat-ing for the error comprising: determining a first correction value associated with the second distance and a second correction value associated with the third distance; wherein the corrected second distance is based at least in part on the first correction value and the second distance; and wherein the corrected third distance is based at least in part on the second correction value, and the third distance.

In addition to one or more of the features described herein, or as an alternative, further embodiments of the computer implemented method may include determining a third correction value associated with the corrected second distance; determining a fourth correction value associated with the corrected third distance; comparing a difference between the first correction value and the third correction value to a first threshold; and comparing a difference between the second correction value and the fourth correc-tion value to a second threshold.

In addition to one or more of the features described herein, or as an alternative, further embodiments of the computer implemented method may include saving the corrected second distance and the corrected third distance when the difference between the first correction value and the third correction value is less than the first threshold and the difference between the second correction value and the fourth correction value is less than the second threshold.

In addition to one or more of the features described herein, or as an alternative, further embodiments of the computer implemented method may include: determining a corrected fourth distance based at least in part on the third correction value and the second distance when the difference between the first correction value and the third correction value is greater than the first threshold; and determining a corrected fifth distance based at least in part on the fourth correction value and the third distance when the difference between the second correction value and the fourth correction value is greater than the second threshold.

In addition to one or more of the features described herein, or as an alternative, further embodiments of the computer implemented method may include repeating the steps when the difference between the first correction value) and the third correction value is greater than the first threshold or the difference between the second correction value and the fourth correction value is greater than the second threshold.

In addition to one or more of the features described herein, or as an alternative, further embodiments of the computer implemented method may include the first correction value and the second correction value being determined from a lookup table.

In addition to one or more of the features described herein, or as an alternative, further embodiments of the computer implemented method may include determining a first brightness and a second brightness based at least in part on a brightness correction lookup table, the first brightness being based at least in part on the corrected second distance and the second brightness being based at least in part on the corrected third distance.

In addition to one or more of the features described herein, or as an alternative, further embodiments of the computer implemented method may include performing a validation of the corrected second distance and the corrected third distance.

In addition to one or more of the features described herein, or as an alternative, further embodiments of the computer implemented method may include the validation including a finding of an average distance of the corrected second distance and the corrected third distance and comparing a difference between the first distance and the average distance to a threshold.

In addition to one or more of the features described herein, or as an alternative, further embodiments of the computer implemented method may include determining the corrected second distance and the corrected third distance are invalid when the difference between the first distance and the average distance is greater than a threshold.

In addition to one or more of the features described herein, or as an alternative, further embodiments of the computer implemented method may include replacing the corrected second distance and the corrected third distance with the first distance when the corrected second distance and the corrected third distance are invalid.

In addition to one or more of the features described herein, or as an alternative, further embodiments of the computer implemented method may include: determining a noise level in the distance measurement; discarding the corrected second distance and the corrected third distance when the noise level is above a threshold; and saving the first distance into memory.

In addition to one or more of the features described herein, or as an alternative, further embodiments of the computer implemented method may include the determining of the noise level being based at least in part on a comparison of the amplitude of the signal to an overall power signal.

According to one or more embodiments, a computer program product comprising a memory device with computer executable instructions stored thereon is provided. The computer executable instructions when executed by one or more processors cause the one or more processors to perform a method comprising: transmitting a beam of light from a 3D scanner and receiving a reflection of light from a scan-point of an object in a surrounding environment, the beam of light having a base frequency and at least on measurement frequency equal to a multiple of the base frequency, the 3D scanner being configured to determine a distance to the object being determined based on a phase-shift of the reflected beam of light at the measurement frequency; generating a signal in response to receive the reflection of light; determining a first distance to the scan-point based at least in part on phase-shift of the signal, the phase-shift determined using a first signal processing method based on the measurement frequency; determining a second distance and a third distance based on a phase-shift of the signal, the phase-shift determined using a Fourier transform at measurement frequency on a pair of adjacent half-cycles; determining a corrected second distance and a corrected third distance by compensating for an error in the second distance and third distance, the error being defined at least in part on the performing of the Fourier transform on the pair of adjacent half-cycles; and saving the corrected second distance and third corrected distance into memory.

In addition to one or more of the features described herein, or as an alternative, further embodiments of the computer program product may include the signal processing method being a Fourier Transform.

In addition to one or more of the features described herein, or as an alternative, further embodiments of the computer program product may include the compensating for the error including a performing of a second Fourier transform on a filtered signal generated by the high pass filter at the measurement frequency.

In addition to one or more of the features described herein, or as an alternative, further embodiments of the computer program product may include the second Fourier transform being performed on two adjacent full cycles of the second frequency.

In addition to one or more of the features described herein, or as an alternative, further embodiments of the computer program product may include the compensating for the error includes: determining a first correction value associated with the second distance and a second correction value associated with the third distance; wherein the corrected second distance is based at least in part on the first correction value and the second distance; and wherein the corrected third distance is based at least in part on the second correction value, and the third distance.

In addition to one or more of the features described herein, or as an alternative, further embodiments of the computer program product may include: determining a third correction value associated with the corrected second distance; determining a fourth correction value associated with the corrected third distance; comparing a difference between the first correction value and the third correction value to a first threshold; and comparing a difference between the second correction value and the fourth correction value to a second threshold.

In addition to one or more of the features described herein, or as an alternative, further embodiments of the computer program product may include saving the corrected second distance and the corrected third distance when the difference between the first correction value and the third correction value is less than the first threshold and the difference between the second correction value and the fourth correction value is less than the second threshold.

In addition to one or more of the features described herein, or as an alternative, further embodiments of the computer program product may include: determining a corrected fourth distance based at least in part on the third correction value and the second distance when the difference between the first correction value and the third correction value is greater than the first threshold; and determining a corrected fifth distance based at least in part on the fourth correction value and the third distance when the difference between the second correction value and the fourth correction value is greater than the second threshold.

In addition to one or more of the features described herein, or as an alternative, further embodiments of the computer program product may include repeating the steps when the difference between the first correction value and the third correction value is greater than the first threshold or the difference between the second correction value and the fourth correction value is greater than the second threshold.

In addition to one or more of the features described herein, or as an alternative, further embodiments of the computer program product may include the first correction value and the second correction value being determined from a lookup table.

In addition to one or more of the features described herein, or as an alternative, further embodiments of the computer program product may include determining a first brightness and a second brightness based at least in part on a brightness correction lookup table, the first brightness being based at least in part on the corrected second distance and the second brightness being based at least in part on the corrected third distance.

In addition to one or more of the features described herein, or as an alternative, further embodiments of the computer program product may include performing a validation of the corrected second distance and the corrected third distance.

In addition to one or more of the features described herein, or as an alternative, further embodiments of the computer program product may include the validation including a finding of an average distance of the corrected second distance and the corrected third distance and comparing a difference between the first distance and the average distance to a threshold.

In addition to one or more of the features described herein, or as an alternative, further embodiments of the computer program product may include determining the corrected second distance and the corrected third distance are invalid when the difference between the first distance and the average distance is greater than a threshold.

In addition to one or more of the features described herein, or as an alternative, further embodiments of the computer program product may include replacing the corrected second distance and the corrected third distance with the first distance when the corrected second distance and the corrected third distance are invalid.

In addition to one or more of the features described herein, or as an alternative, further embodiments of the computer program product may include: determining a noise level in the distance measurement; discarding the corrected second distance and the corrected third distance when the noise level is above a threshold; and saving the first distance into memory.

In addition to one or more of the features described herein, or as an alternative, further embodiments of the computer program product may include the determining of the noise level being based at least in part on a comparison of the amplitude of the signal to an overall power signal.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
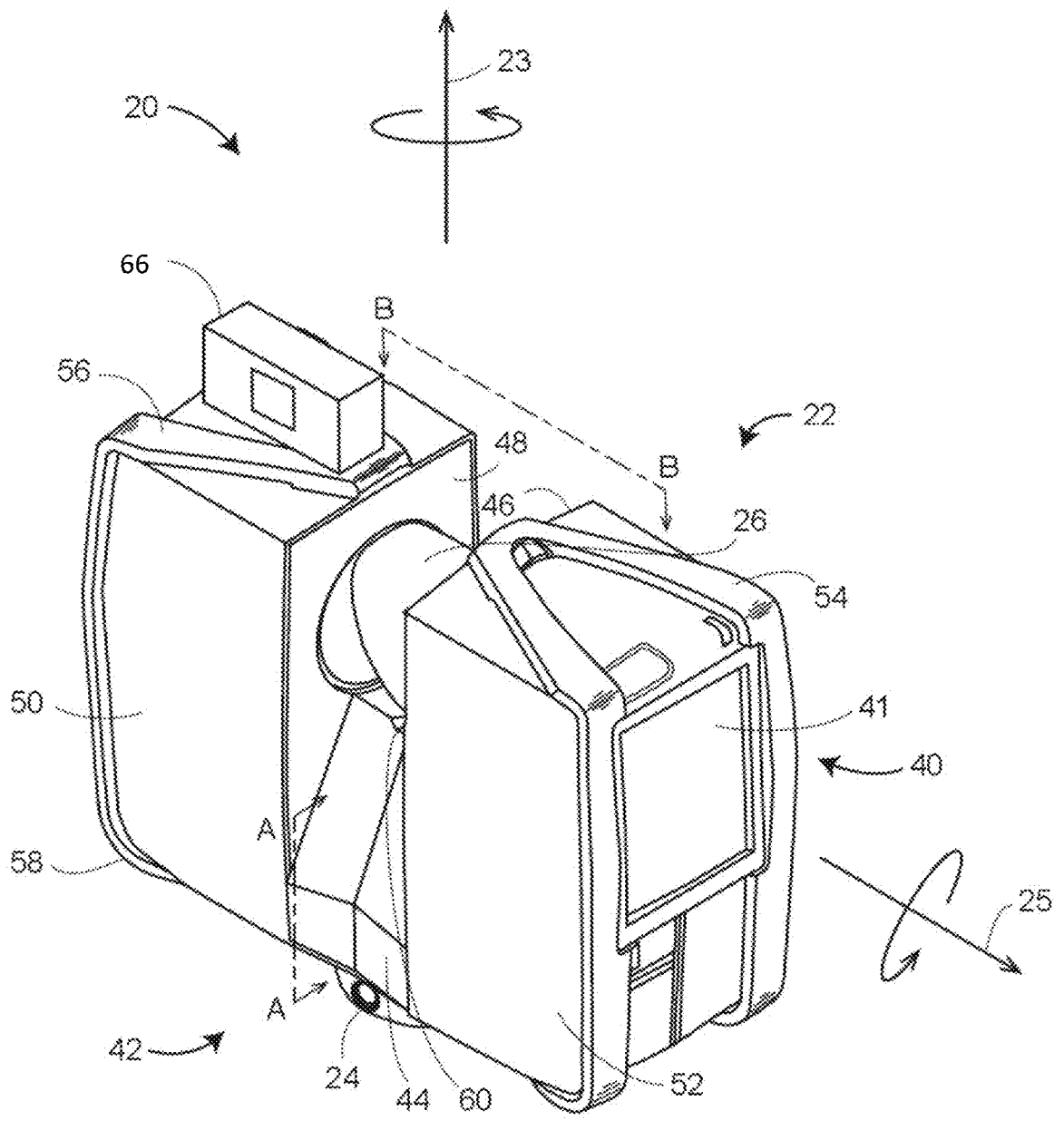
FIG. 1 is a perspective view of a laser scanner in accordance with an embodiment.

The detailed description explains embodiments of the invention, together with advantages and features, by way of example with reference to the drawings.

DETAILED DESCRIPTION

Embodiments herein relate to a three-dimensional 3D measurement device having a 3D scanner. The 3D scanner captures a point cloud representing a scene in an environment. The point cloud is a set of scan-points, each scan-point being captured from a surface in the scene. The scan-points have 3D coordinates representing their location in the scene. Embodiments of the technical solutions described herein facilitate a high resolution in high speed scanning of a scene with improved identification of when a measurement is performed within a desired distance interval. Still further embodiments provide technical solutions for increasing a distance interval and avoiding false mapping of the scan-points. Embodiments of technical solutions described herein further facilitate the compensation of measurements when a measurement is performed on a surface outside of the desired interval range. Embodiments provide advantages in extending the unambiguity range of laser scanners to achieve higher resolution scans of the scene, particularly in comparison to existing techniques.

In the existing techniques, three-dimensional measurement devices, such as the laser scanner 20, emit light and receive a reflection of the light. Based on a propagation time of the emission and reception of the light beams, a distance may be determined. As discussed herein, when the distance is combined with measured zenith and azimuth angles, three-dimensional coordinates of a scan-point on a surface in the scene may be determined.

The propagation time may be determined in various ways, such as the pulse propagation time methods, and continuous wave (CW) methods. In the pulse propagation time methods, the emission light beam contains only a short emission pulse for each measuring operation. The time until the reflected pulse arrives in the receiver is measured. In contrast, in CW methods, a continuous emission light beam is emitted and the propagation time is determined on the basis of the phase shift between the emission and reception light beams. In this embodiment, the emission light beam may be amplitude-modulated with the aid of a base signal and the phase shift of the measurement signal in the emitted and received light beams is used for determining propagation time. Generally the higher the base frequency, the more accurately the distance may be determined and at a higher resolution (i.e. density of scan-points). However, as the base frequency is increased, the unambiguity range decreases. This is due to the phase shift between the emission and reception light beams repeating after a phase cycle of 360°.

Embodiments of the present disclosure provide technical solutions for determining whether the phase cycle of the modulation frequency has repeated. This provides advantages in allowing for the use of higher frequency base signals to improve the resolution of the point cloud in a scene.

Figure 2:
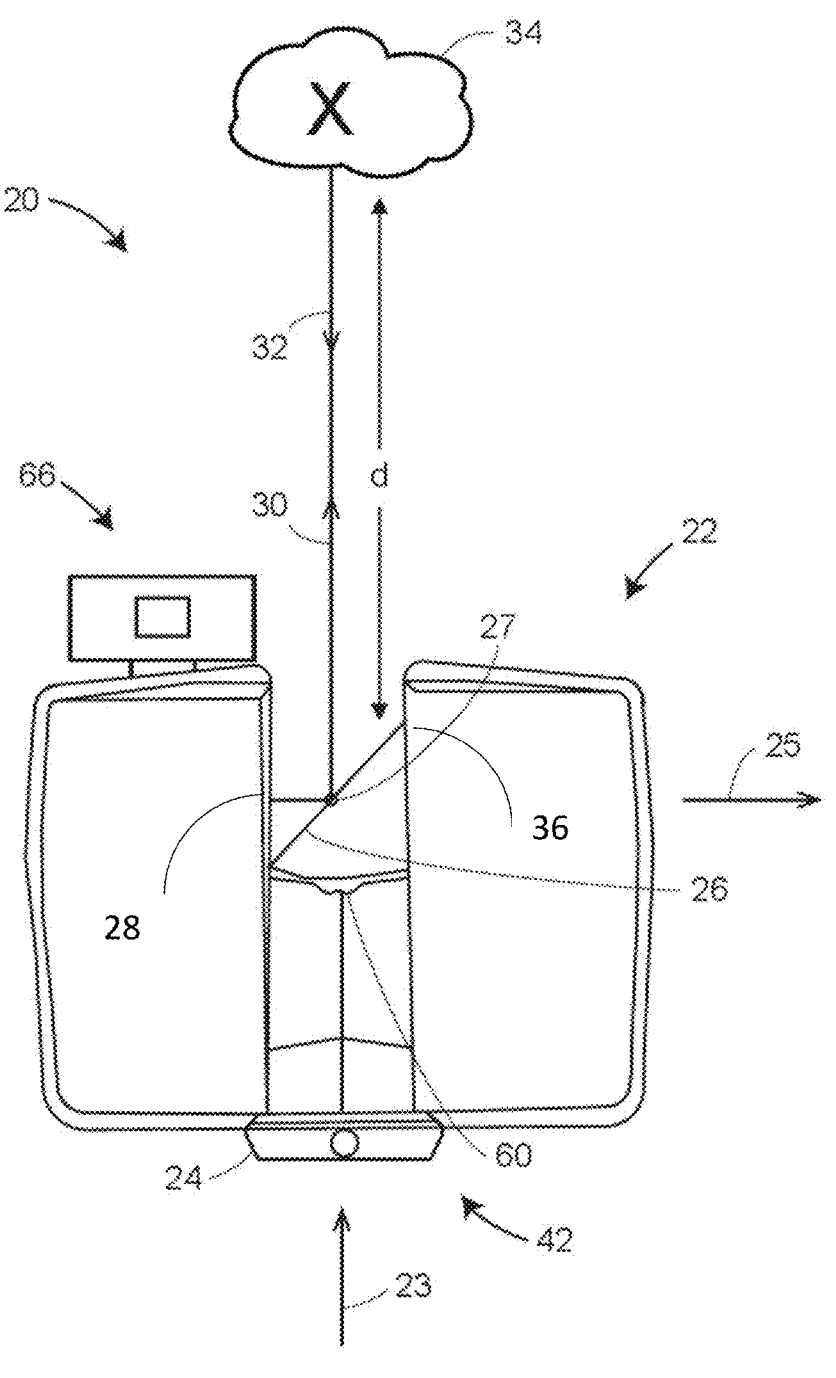
FIG. 2 is a side view of the laser scanner illustrating a method of measurement according to an embodiment.

Referring now to FIGS. 1-2, a measurement device 100 includes a laser scanner 20 for optically scanning and measuring the environment surrounding the measurement device 100. The measurement device 100 may further include a camera 66 to capture color images of the surroundings.

The laser scanner 20 is an example 3D measurement device according to one or more embodiments of the technical solutions described herein. It should be noted that the 3D measurement device can be other types of devices than the laser scanner 20 of FIG. 1. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms "azimuth axis" and "zenith axis" may be substituted for the terms "vertical axis" and "horizontal axis," respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a base frequency having a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 2), a corresponding number of distances d between the laser scanner 20 and the points X on object 34. The distance to a particular point X is determined based at least in part on the speed of light in air through which electromagnetic radiation propagates from the device to the object point X. The phase shift of measurement frequency of the light emitted by the laser scanner 20 and the point X is determined and evaluated to obtain a measured distance d. In an embodiment, the scanner 20 may emit the light with a plurality of frequencies in a similar manner to that described in commonly owned U.S. Pat. No. 8,064,046, the contents of which is incorporated by reference herein. In an embodiment, the frequencies include 1 MHz, 2 MHz, 28 MHz, 32 MHz and 256 MHz.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

The measured distance "d" may be determined unambiguously over an interval for a given base frequency. For example, it has been found that a fundamental base frequency of 1 MHz roughly provides an unambiguity range of 150 meters, while a base frequency of 2 MHz provides an unambiguity range of 75 meters. It should be appreciated that the resolution, in other words the scan-point density, for the 2 MHz frequency will be twice that of the 1 MHz frequency if the speed of the rotating mirror is kept constant, but at a substantially smaller interval range. If a laser scanner 20 measures a point on a surface outside of the interval range, it will provide an incorrect distance since the signal will have repeated.

In an embodiment, it is desired to have the resolution of the 2 MHz base frequency, but with the range of the 1 MHz base frequency. As discussed in more detail herein this allows to provide a higher resolution scan that determines an interval that the measured surface is located. Further embodiments provide advantages in determining a validity of the scan-points.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

In an embodiment, an auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera. The color camera can be equipped with a rectilinear lens, an ultrawide-angle lens, sometimes referred to as a "fisheye camera," or any other such lens to capture the color information of the one or more surfaces in the volume captured by the laser scanner 20.

In an embodiment, the camera 66 is rotated by a motor 138 and the angular/rotational position of the camera 66 can be measured by angular encoder 132. The camera 66 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the camera 66 about the axis 25.

Figure 3:
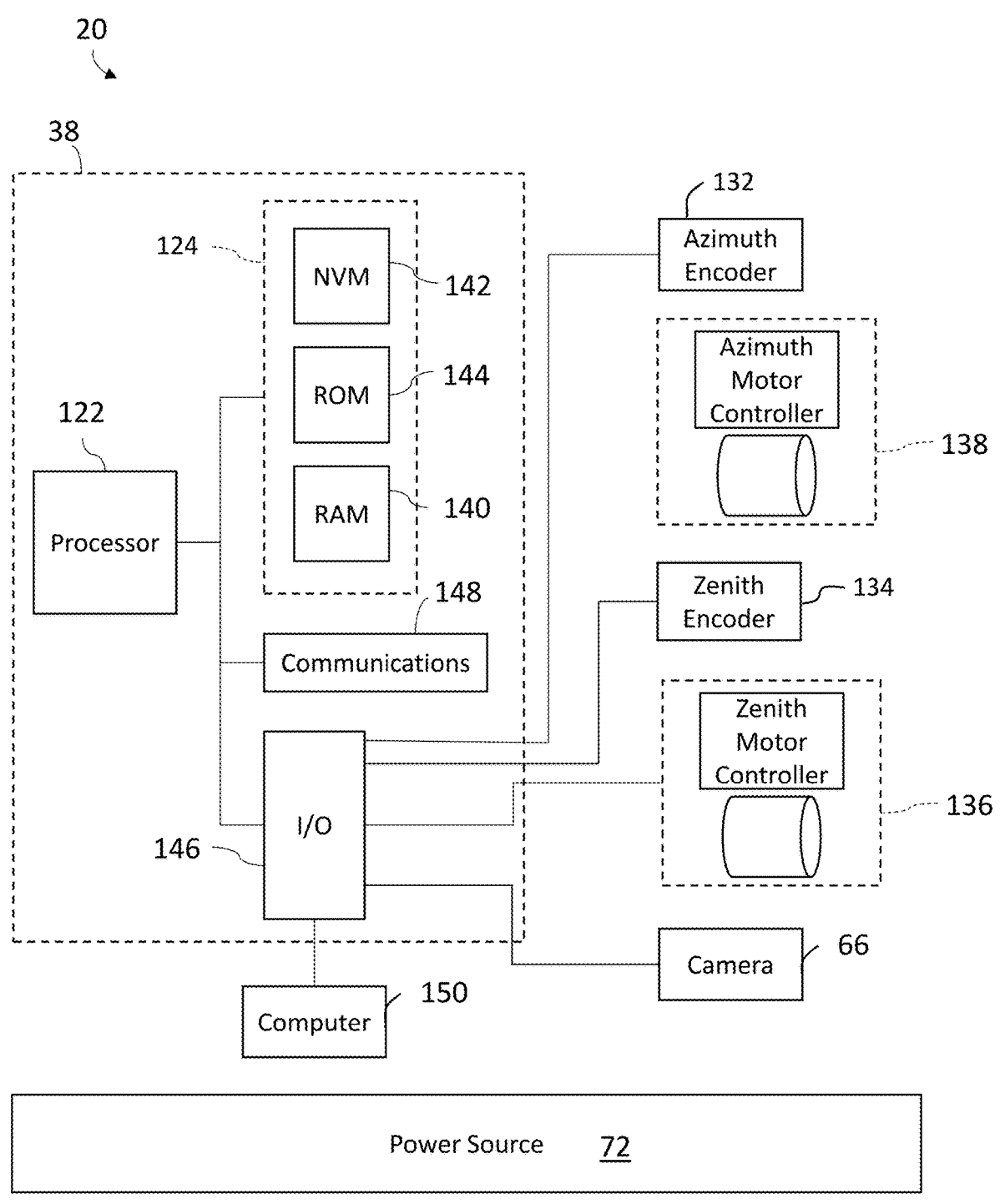
FIG. 3 illustrates a schematic illustration of the laser scanner of FIG. 1 according to an embodiment.

Referring now to FIG. 3 with continuing reference to FIGS. 1-2, elements are shown of the measurement device 100. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 can convert the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by the camera 66, angular/rotational measurements by a first or azimuth encoder 132, and angular/rotational measurements by a second axis or zenith encoder 134.

In general, controller 38 accepts data from encoders 132, 134, light receiver 36, light source 28, and camera 66 and is given certain instructions for the purpose of generating a 3D point cloud of a scanned environment. Controller 38 provides operating signals to the light source 28, light receiver 36, camera 66, zenith motor 136, and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touchscreen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C #, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

In some embodiments, the controller 38 provides the data captured by the measurement device 100, i.e., the point cloud(s) and captured image(s) to a computer 150. The controller 38 communicates with the computer via a wired or wireless network. The computer 150 processes the data that is captured by the measurement device 100, as described herein.

Figure 4A:
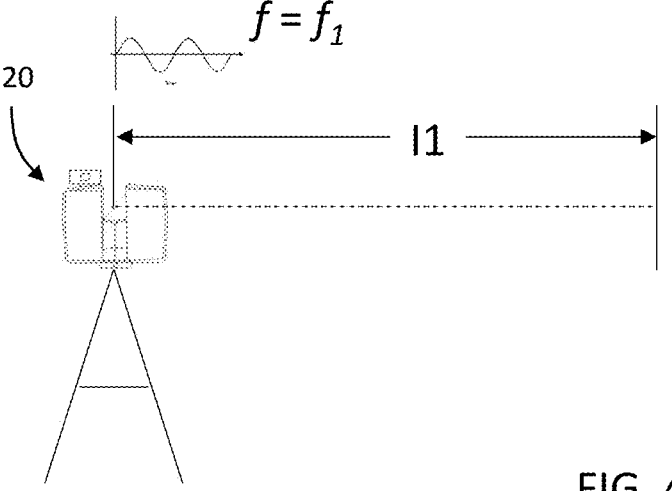
FIG. 4A is a schematic illustration of a laser scanner having an unambiguity over a first interval.
Figure 4B:
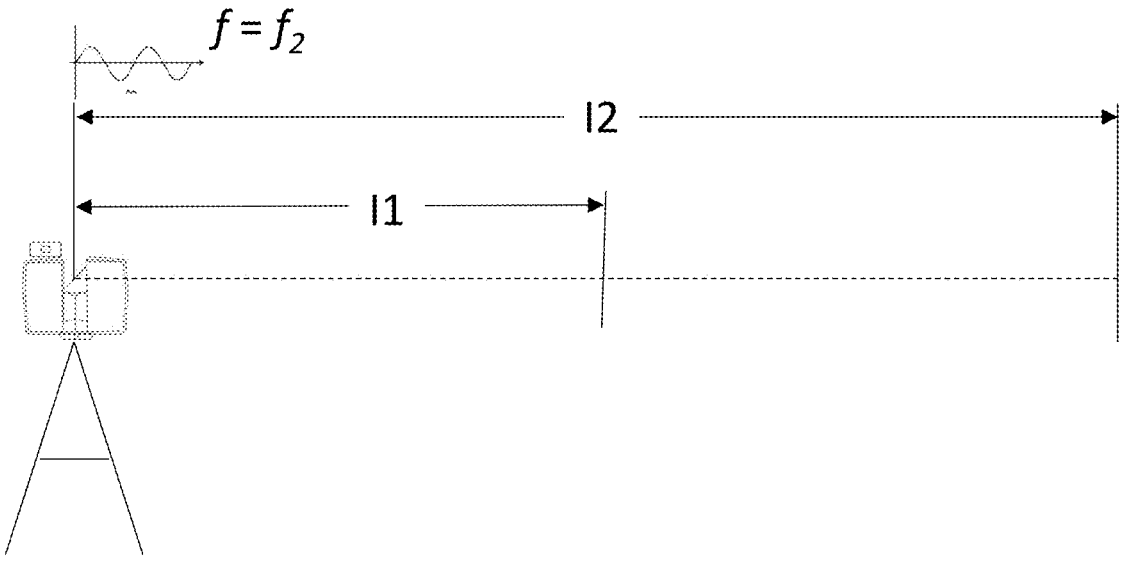
FIG. 4B is a schematic illustration of a laser scanner having an unambiguity over a second interval.
Figure 4C:
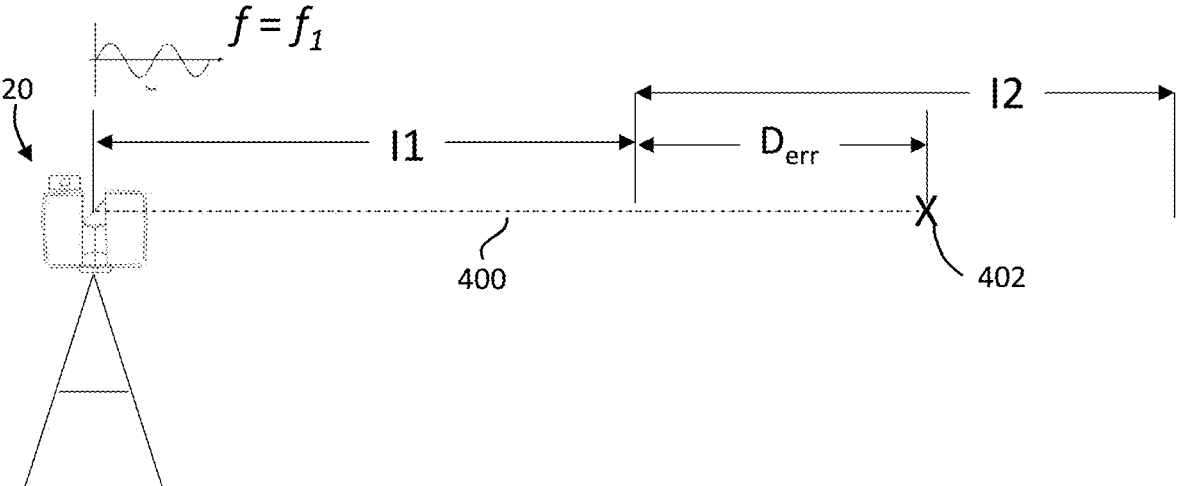
FIG. 4C is a schematic illustration of a of a laser scanner having an unambiguity over the first interval and measuring a distance to a surface in the second interval.

Referring now to FIG. 4A-FIG. 4C, embodiments are illustrated describing the operation of the laser scanner 20. As discussed herein, the laser scanner 20 is configured to measure a point in the scene based on the difference in phase between the emitted beam of light and the received beam of light. Since the phase of the light will start to repeat after the phase-shift reaches 360°, for a given base frequency the measurements will be unambiguous within a particular distance of the laser scanner 20. This unambiguity range is referred to as an "interval." In other words, the interval is a distance at which the beam of light travels and returns to the laser scanner with a 360° phase-shift.

In the embodiment of FIG. 4A, the laser scanner 20 emits a beam of light having a base frequency of $f_1$ (that includes a measurement frequency $f_m$) that measures scan-points over the distance I1. Where the base $f_1$ is 2 MHz, the interval I1 is about 75 meters. In the embodiment of FIG. 4B, the laser scanner 20 emits a beam of light having a base frequency of $f_2$ that measures scan-points over a distance or interval I2. Where the frequency $f_2$ is 1 MHz, the interval I2 is about 150 meters. It should be appreciated that when light is emitted by the laser scanner 20, the light will travel until it hits a surface, whereupon a portion of the emitted light beam will travel back along the same path to the laser scanner 20. When the surface the light strikes is beyond the first interval, the distance measurement determined by the laser scanner 20 will be incorrect.

For example, in the embodiment of FIG. 4C, the laser scanner 20 emits a beam of light 400 that strikes a surface 402. In this embodiment, the surface 402 is beyond or past the end of the first interval I1. As a result, due to the repeating of the phase of the measurement frequency of the beam of light, the distance determined by the laser scanner 20 will be $D_{err}$ rather than the true distance of $I1+D_{err}$. By way of example, in an embodiment, the laser scanner 20 may emit light 400 with a base frequency of 2 MHz, resulting in an interval I1 of 75 meters. The light 400 is emitted and reflects off of a surface 402 that is 85 meters from the scanner 20. The reflected light is received by the laser scanner 20 with a phase-shift of 360°+the phase-shift for 10 meters (approx. 360°+48°=408°). Since prior art laser scanners would determine a 48° phase-shift, the distance for that scan-point would be recorded as 10 meters.

Figure 5:
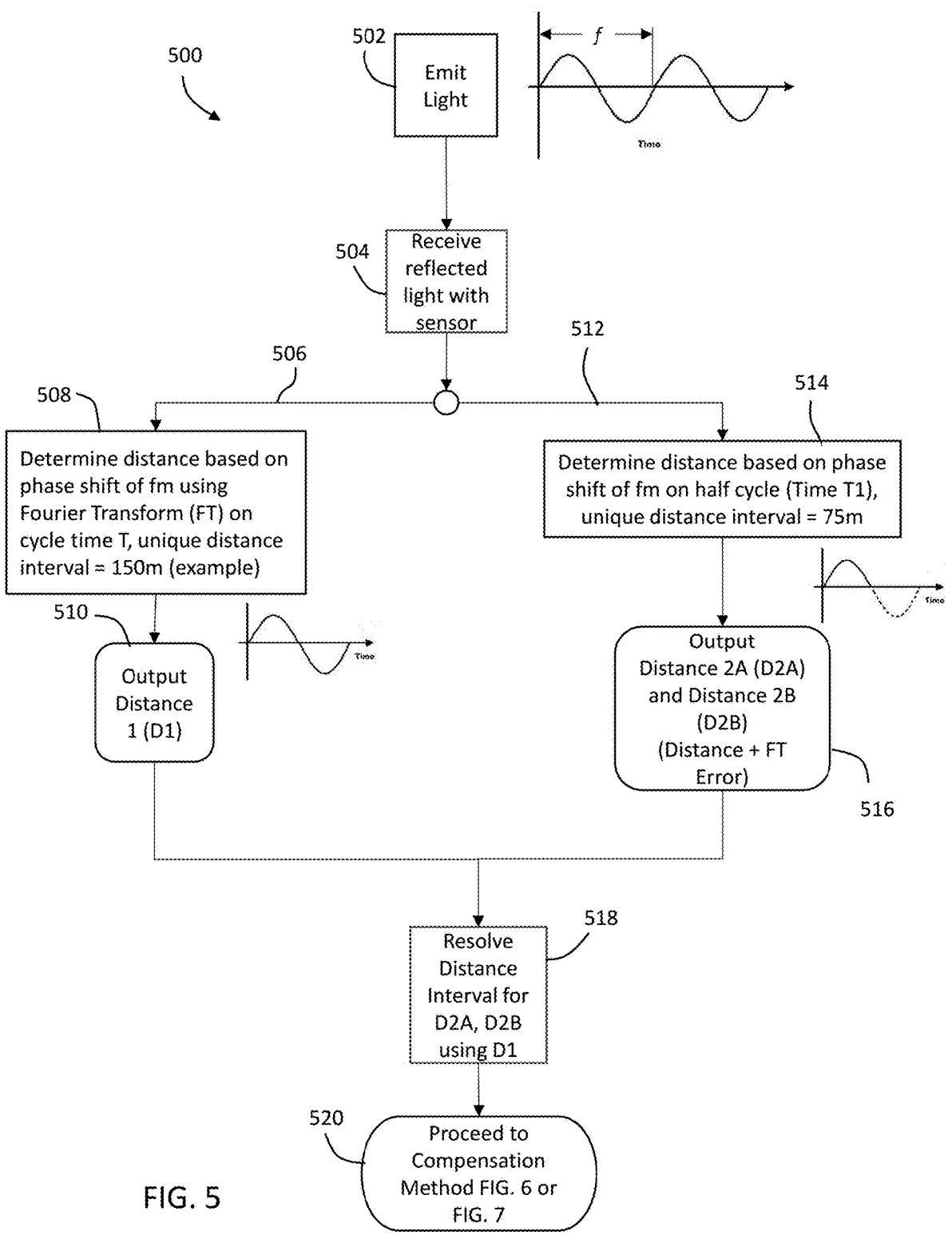
FIG. 5 depicts a flowchart of a method for generating a point cloud using a measurement device according to one or more embodiments.

Referring now to FIG. 5, an embodiment is shown of a method 500 for determining which interval the scan-point is located so as to accurately determine a distance to the scan-point 402. The method 500 begins in block 502 where a beam of light 400 is emitted from the laser scanner 20. In the illustrated embodiment, the light 400 has a base frequency of 1 MHz plus at least one higher order measurement frequency that is a multiple of the base frequency. In an embodiment, the base frequency is 1 MHz and the measurement frequency may be selected from a group comprising: 2 MHz, 4 MHz, 28 MHz, 32 MHz and 256 MHz for example. It should be appreciated that in other embodiments, other base frequencies may be used. For example, in other embodiments the base frequency is 1 MHz and the measurement frequency is 125 MHz The light 400 is reflected off of a surface 402 back to the laser scanner 20 where the phase-shift is determined at the measurement frequency.

In this embodiment, it is desired to have a higher/faster scanning speed than can be provided with the 1 MHz base frequency. Further, it is desired to measure scan-points that are positioned outside of the unambiguity interval (e.g. 75 meters) that may be achieved using a 2 MHz base frequency. Once the reflected light 400 is received by the laser scanner in block 504, the method 400 bifurcates or splits into two parallel processes. In the first branch 506 of method 500, the distance to the scan-point 402 is determined based on a phase-shaft using a 125 MHz signal processing method in block 508. In some embodiments, the signal processing method may include, but is not limited to Fourier transform, convolution theorem, correlation theorem, and a wavelet transform for example. In the exemplary embodiment, the signal processing method is a Fourier Transform over a cycle time T, for a given distance interval. Since the scan-point 402 is within the unambiguity interval of the 1 MHz base frequency, the distance to the scan-point 402 may be accurately determined. The distance D1 is saved in block 510.

In the second branch 512 of the method 500, a first distance D2A and a second distance D2B are determined by performing a first 125 MHz Fourier Transform on the first half-cycle and a second 125 MHz Fourier Transform on the second half-cycle of the 1 MHz base signal in block 514. It should be appreciated that since the Fourier Transform method assumes a repeating cycle in the signal, and the first and second transforms are performed on only a half-cycle, the determined distances D2A, D2B will each include a transform error term (e.g. accurate distance=D2A−Fourier-transform-error). The distance values D2A, D2B are stored in block 516.

The method 500 then proceeds to block 518 where the distance interval for D2A, D2B is determined using the distance D1. In other words, it is determined whether the scan-point is positioned within the distance interval I1 or I2 (FIG. 4). In the illustrated embodiment, the distance interval I1 is the interval for a second base frequency (i.e. 75 meters), while the distance interval I2 is the interval that extends to the first base frequency unambiguity distance (i.e. 150 meters).

The method 500 this proceeds to block 520 where a compensation method 600, 700 is performed. The compensation methods 600, 700 remove the error from the distances D2A, D2B that is caused by performing the Fourier transform on a half-cycle.

Figure 6:
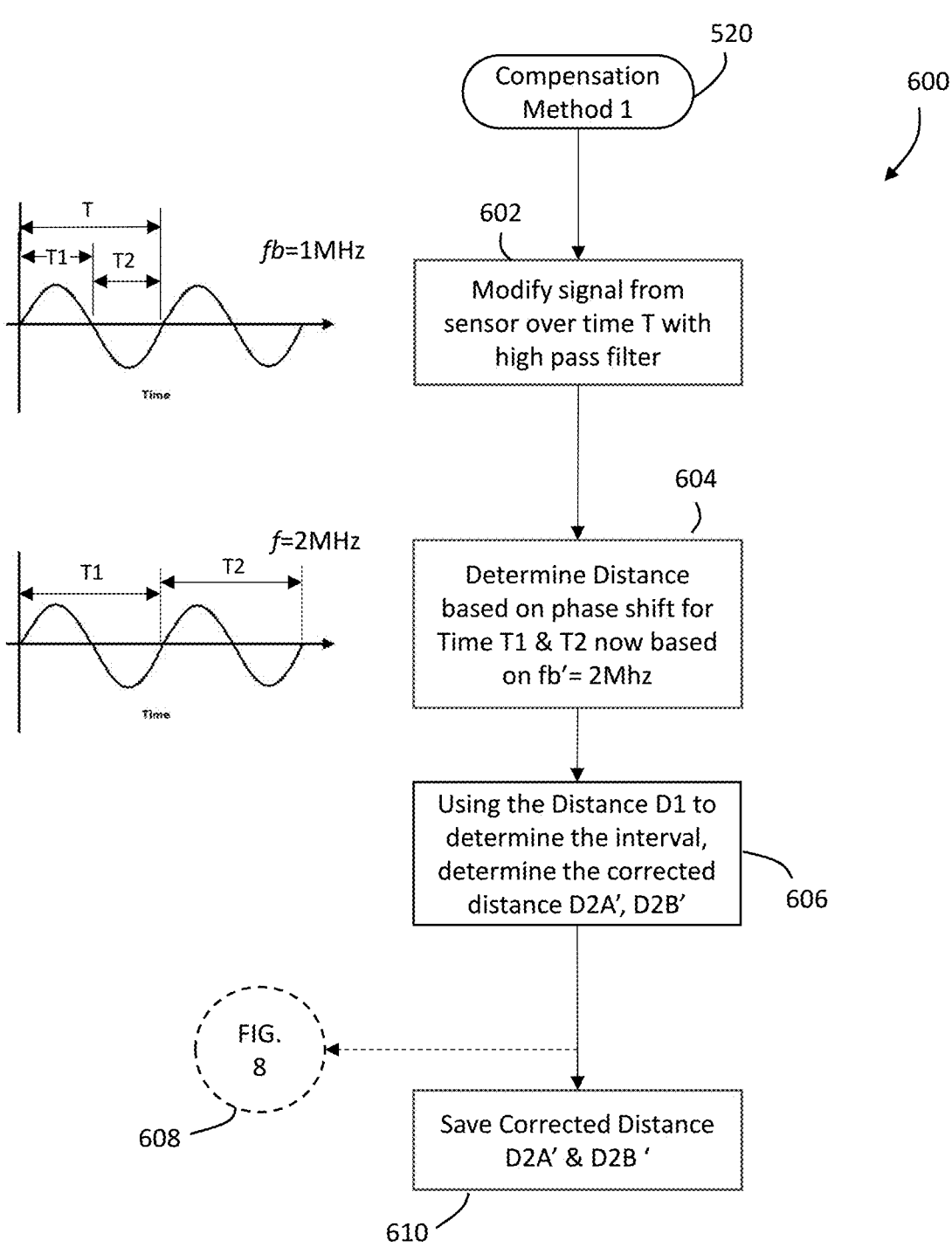
FIG. 6 depicts a flowchart of a method of compensating a distance determined in FIG. 5 in accordance with an embodiment.

Referring now to FIG. 6, a first embodiment is shown of a method 600 for compensating for the error term in distances D2A, D2B. The method 600 receives the values D2A, D2B and distance D1 from method 500 and proceeds to block 602 where the received signal from the reflected light 400 is modified over a time T using a high pass filter. The high pass filter is configured to remove the 1 MHz signal from the reflected light signal, leaving a second base frequency that is at least two times the original base frequency. In the exemplary embodiment, the original base frequency is 1 MHz and the second base frequency is 2 MHz. As a result, the first half cycle (time T1) and second half cycle (time T2) of the original base frequency (e.g. 1 MHz) signal is converted into a pair of full-cycle second base frequency (e.g. 2 MHz) signals. It should be appreciated that the second base frequency (e.g. 2 MHz) signal over time T1+T2 is the same time period as the time T of the original base frequency (1 MHz) signal.

The method 600 then proceeds to block 604 where the distance to the scan-point is determined using a measurement frequency (e.g. 125 MHz) Fourier transform on the pair of full-cycle second base frequency (e.g. 2 MHz) signals to determine the phase-shift on each of the measurement frequency signals for time T1 and T2. Since the Fourier transform is performed on a repeating cycle, the distance measurements will be accurate. The method 600 then proceeds to block 606 where the corrected distance values D2A', D2B' are determined based on the distance value D1 to determine the interval. In other words, when the scan-point is within the interval I1, the corrected distance values D2A', D2B' determined in block 604 are the actual distances to the scan-point. When the scan-point, such as scan-point 402 for example, is in the second interval I2, the corrected distance values will be the distances calculated in block 604 plus the interval I1. For example, if scan-point 402 is located 85 meters from the scanner 20, block 604 will return values of 10 meter. The corrected distance values D2A', D2B' would then be the length of interval I1 (75 meters) plus the calculated distances (10 meters) to equal 85 meters.

In some embodiments, the method 600 then proceeds to an optional validation block 608 which performs a method 800 before saving the corrected distance values D2A', D2B' in block 610.

Figure 8:
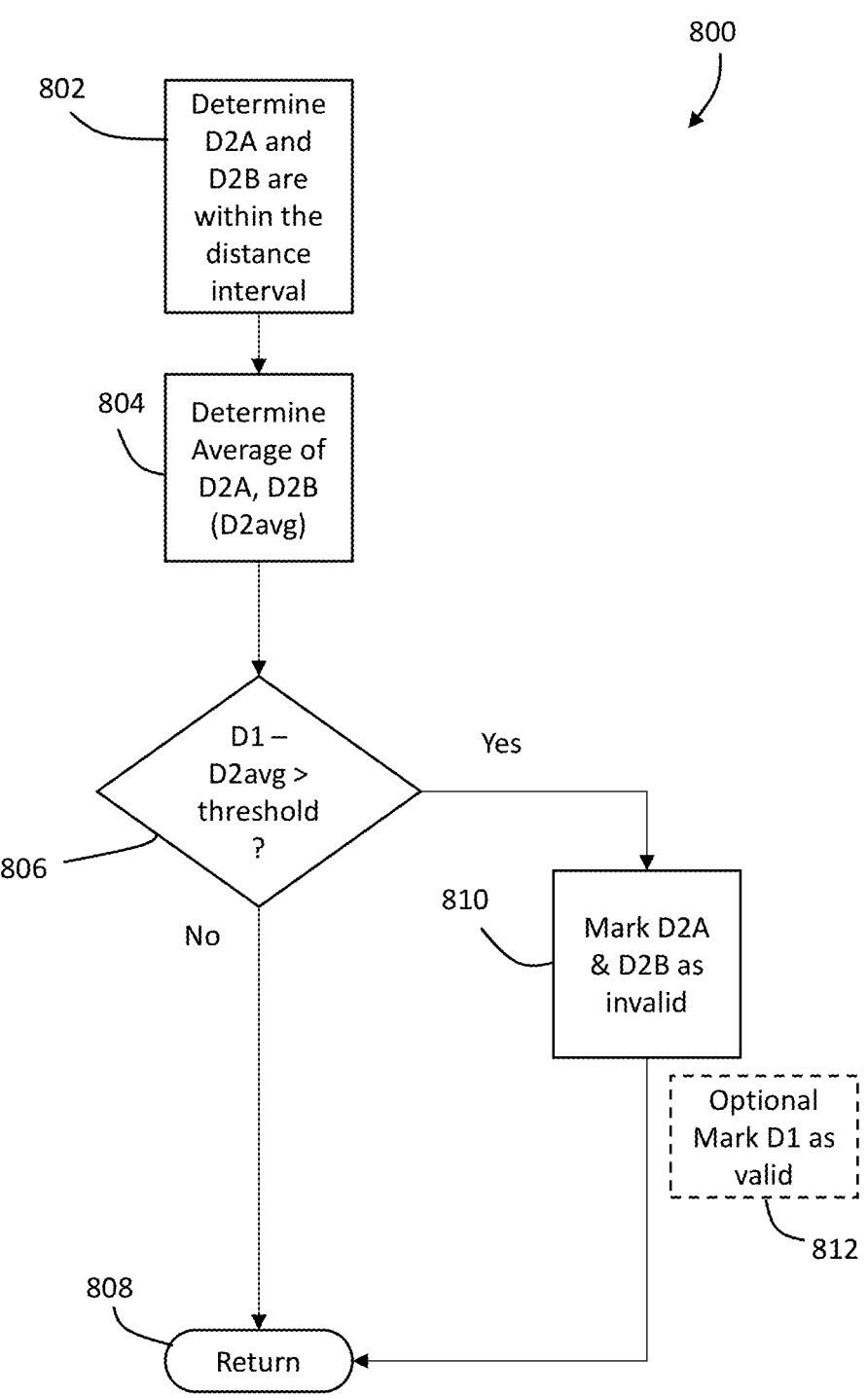
FIG. 8 depicts a flowchart of a method of determining whether a measured point is valid.

Referring to FIG. 8, an embodiment of a validation method 800 is shown for determining whether the corrected distance values D2A', D2B' are valid. The method 800 begins in block 802 where the corrected distance values D2A', D2B' are determined (or received from the compensation method). The method 800 then proceeds to block 804 where the average value (D2avg) of corrected distance values D2A', D2B' is determined. It is expected that the average of the corrected distance values D2A', D2B' will be approximately the same as D1. The method 800 then proceeds to query block 806 where the difference of the distance D1 and average value D2avg is compared with a threshold. When the difference is less than a threshold, the method 800 proceeds to block 808 and returns to the compensation method.

When the query block 806 returns a positive (the difference is greater than a threshold), the method 800 proceeds to block 810 where the corrected distance values D2A', D2B' are marked as invalid. In other words, the scan-point measurements are discarded. In an embodiment, an optional block 812 is performed and the distance D1 is marked as valid and saved. Thus there is a reduction in resolution, but some data is still preserved. The method 800 then proceeds to block 808 and returns to the compensation method.

In an embodiment, the method 800 may use a noise level in the distance measurement to determine the validity of the corrected distance values D2A', D2B'. In this embodiment, rather than comparing the average of the corrected distance values D2A', D2B' to the distance value D1, the method 800 determines a noise level in the signal and compares this to a threshold. Noise may occur in the signal due to factors such as a smaller integration time, larger distance or reduced reflectivity for example. When the noise level is greater than or equal to a threshold, the corrected distance values D2A', D2B' are discarded or deleted and the first distance value is saved to memory. In an embodiment, the noise level is determined by comparing the amplitude of the signal to an overall signal power for example.

Figure 7:
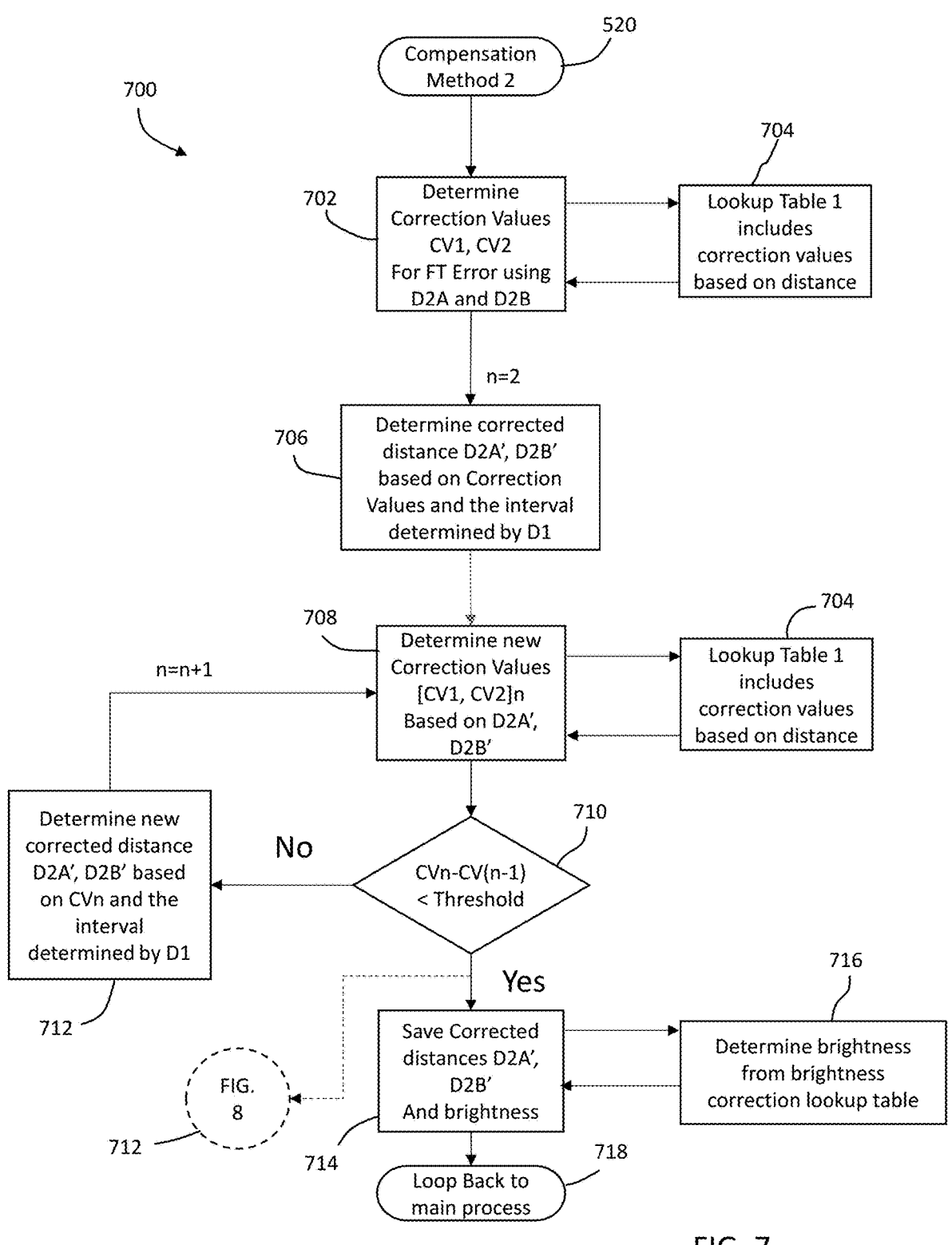
FIG. 7 depicts a flowchart of a method of compensating a distance determined in FIG. 5 in accordance with another embodiment.

Referring now to FIG. 7 another method 700 is shown for compensating the distance values D2A, D2B to remove the error term. The method 700 starts in block 702 where a correction value CV1 for the Fourier transform error is determined using D2A, D2B from a lookup table 704. It should be appreciated that for a given measured distance value, the error component of the value should remain about the same from scanner to scanner and from location to location. As a result, an initial estimated correction value may be provided by a lookup table 704.

The method 700 then proceeds to block 706 where corrected distance values D2A', D2B' are determined based on the correction value CV1, CV2 and the interval determined by distance D1. The method 700 then proceeds to block 708 where a new correction value (CVn) from lookup table 704 is determined for distance values D2A', D2B'. The method 700 then proceeds to query block 710 where the difference between the new correction value CVn and the previous correction value is compared with a threshold. When the difference between CVn and CV(n−1) is greater than a threshold, the method 700 proceeds to block 712 where a new corrected distance values D2A', D2B' are determined based on the correction value CVn and the interval determined by distance D1 and the method 700 loops back to block 707.

This loop process continues until the difference between CVn and CV(n−1) is less than the threshold where the query block 710 returns a positive. In an embodiment, the method 700 will proceed with the validation method 800 in block 712 as described herein above. Once the validation method is completed, the method 700 proceeds to block 714 where the corrected distances D2A', D2B' are saved. In an embodiment, a brightness correction may be determined from a look up table 716. The corrected brightness is saved with the corrected distances D2A', D2B'. The method 700 then proceeds to block 718 where it proceeds back to method 500.

It should be appreciated embodiments herein provide technical solutions for increasing a resolution of a three-dimensional laser scan performed using phase-based time of flight techniques. It should further be appreciated that while embodiments herein may refer to specific base frequencies (e.g. 1 MHz, 2 MHz), these are for example reasons and the claims should not be so limited. In other embodiments, other frequencies may be used to either increase the resolution and the operating range of the laser scanner. For example, in other embodiments, the base frequency may be 2 MHz (interval range 75 meters) and the half-cycle distances may be based on a 4 MHz frequency (interval range 37.5 meters).

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:

a three-dimensional (3D) scanner that captures a scan-point of an object in a surrounding environment by emitting toward the object a beam of light having a base frequency and a measurement frequency equal to a multiple of base frequency and receiving a reflection of the beam of light from the object at the scan-point; and one or more processors that determine a distance to the scan-point based on a phase-shift of the reflection at the measurement frequency by performing operations that cause the one or more processors to:

receive a signal from the 3D scanner corresponding to the reflection;

determine a first distance to the scan-point based at least in part on the phase-shift of the signal, the phase-shift determined using a signal processing method performed over a full cycle of the measurement frequency of the signal;

determine a second distance and a third distance based on a phase-shift of the base frequency of the signal, where a phase-shift corresponding to the second distance is determined by performing a Fourier transform on a first half-cycle of the base frequency of the signal, and a phase-shift corresponding to the third distance is determined by performing the Fourier transform on a second half-cycle of the base frequency of the signal;

determine, using the first distance, a corrected second distance and a corrected third distance by compensating for an error in the second distance and third distance, the error being defined at least in part on the performing of the Fourier transform on the first and second half-cycles; and save the corrected second distance and corrected third distance.

2. The system of claim 1, wherein the signal processing method is one or more of the Fourier transform, a convolution theorem, a correlation theorem, and a wavelet transform.

3. The system of claim 1, wherein the compensating for the error includes modifying the signal with a high pass filter, the high pass filter removing the base frequency from the signal to generate a second signal, the second signal including the measurement frequency, the measurement frequency equal to at least twice the base frequency.

4. The system of claim 2, wherein the compensating for the error includes performing a Fourier transform on the second signal generated by the high pass filter at the measurement frequency.

5. The system of claim 4, wherein the Fourier transform is performed on two adjacent full cycles of the measurement frequency.

6. The system of claim 1, wherein the compensating for the error includes:

determining a first correction value associated with the second distance and a second correction value associated with the third distance;

wherein the corrected second distance is based at least in part on the first correction value and the second distance; and wherein the corrected third distance is based at least in part on the second correction value, and the third distance.

7. The system of claim 6, further comprising:

determining a third correction value associated with the corrected second distance;

determining a fourth correction value associated with the corrected third distance;

comparing a difference between the first correction value and the third correction value to a first threshold; and comparing a difference between the second correction value and the fourth correction value to a second threshold.

8. The system of claim 7, further comprising saving the corrected second distance and the corrected third distance when the difference between the first correction value and the third correction value is less than the first threshold and the difference between the second correction value and the fourth correction value is less than the second threshold.

9. The system of claim 7, further comprising:

determining a corrected fourth distance based at least in part on the third correction value and the second distance when the difference between the first correction value and the third correction value is greater than the first threshold; and determining a corrected fifth distance based at least in part on the fourth correction value and the third distance when the difference between the second correction value and the fourth correction value is greater than the second threshold.

10. The system of claim 8, further comprising repeating the steps of claim 7 when the difference between the first correction value and the third correction value is greater than the first threshold or the difference between the second correction value and the fourth correction value is greater than the second threshold.

11. The system of claim 6, wherein the first correction value and the second correction value are determined from a lookup table.

12. The system of claim 6, further comprising determining a first brightness and a second brightness based at least in part on a brightness correction lookup table, the first brightness being based at least in part on the corrected second distance and the second brightness being based at least in part on the corrected third distance.

13. The system of claim 1, further comprising performing a validation of the corrected second distance and the corrected third distance.

14. The system of claim 13, wherein the validation includes finding an average distance of the corrected second distance and the corrected third distance and comparing a difference between the first distance and the average distance to a threshold.

15. The system of claim 14, further comprising:

determining the corrected second distance and the corrected third distance are invalid when the difference between the first distance and the average distance is greater than a-the threshold; and replacing the corrected second distance and the corrected third distance with the first distance as a measure distance to the scan-point when the corrected second distance and the corrected third distance are invalid.

16. The system of claim 1, wherein the method further comprises:

determining a noise level in a distance, the noise level based at least in part on a comparison of the amplitude of the signal to an overall power signal;

discarding the corrected second distance and the corrected third distance when the noise level is above a threshold; and saving the first distance as a measured distance to the scan-point.

17. A computer-implemented method comprising:

transmitting a beam of light from a 3D scanner and receiving a reflection of light from a scan-point of an object in a surrounding environment, the beam of light having a base frequency and a measurement frequency equal to a multiple of the base frequency, the 3D scanner being configured to determine a distance to the object being determined based on a phase-shift of the reflection at the measurement frequency;

receiving a signal from the 3D scanner corresponding to the reflection;

determining a first distance to the scan-point based at least in part on phase-shift of the signal, the phase-shift determined using a signal processing method performed over a full cycle of the measurement frequency of the signal;

determining a second distance and a third distance based on a phase-shift of the base frequency of the signal, where a phase-shift corresponding to the second distance is determined by performing a Fourier transform on a first half-cycle of the base frequency of the signal, and a phase-shift corresponding to the third distance is determined by performing the Fourier transform on a second half-cycle of the base frequency of the signal;

determining, using the first distance, a corrected second distance and a corrected third distance by compensating for an error in the second distance and third distance, the error being defined at least in part on the performing of the Fourier transform on the first and second half-cycles; and saving the corrected second distance and corrected third distance.

18. A computer program product comprising a memory device with computer executable instructions stored thereon, the computer executable instructions when executed by one or more processors cause the one or more processors to perform a method comprising:

transmitting a beam of light from a 3D scanner and receiving a reflection of light from a scan-point of an object in a surrounding environment, the beam of light having a base frequency and a measurement frequency equal to a multiple of the base frequency, the 3D scanner being configured to determine a distance to the object being determined based on a phase-shift of the reflection at the measurement frequency;

receiving a signal from the 3D scanner corresponding to the reflection;

determining a first distance to the scan-point based at least in part on phase-shift of the signal, the phase-shift determined using a signal processing method performed over a full cycle of the measurement frequency of the signal;

determining a second distance and a third distance based on a phase-shift of the base frequency of the signal, where a phase-shift corresponding to the second distance is determined by performing a Fourier transform on a first half-cycle of the base frequency of the signal, and a phase-shift corresponding to the third distance is determined by performing the Fourier transform on a second half-cycle of the base frequency of the signal;

determining, using the first distance, a corrected second distance and a corrected third distance by compensating for an error in the second distance and third distance, the error being defined at least in part on the performing of the Fourier transform on the first and second half-cycles; and saving the corrected second distance and corrected third distance.

19. The computer-implemented method of claim 18, wherein:

the compensating for the error includes performing a Fourier transform on a filtered signal generated by a high pass filter at the measurement frequency; and the Fourier transform is performed on two adjacent full cycles of the measurement frequency.

20. The computer program product of claim 19, wherein:

the compensating for the error includes performing a Fourier transform on a filtered signal generated by a high pass filter at the measurement frequency; and the Fourier transform being performed on two adjacent full cycles of the measurement frequency.

\* \* \* \* \*